(12) United States Patent
Steinwender

(10) Patent No.: US 7,037,024 B2
(45) Date of Patent: May 2, 2006

(54) JOINT BETWEEN JOINT FACES OF TWO COMPONENTS

(75) Inventor: Martin Steinwender, Perchtoldsdorf (AT)

(73) Assignee: Fritz Egger GmbH & Co., Unterradlberg (AT)

( * ) Notice: Subject to any disclaimer, the term of this patent is extended or adjusted under 35 U.S.C. 154(b) by 0 days.

(21) Appl. No.: 10/061,963

(22) Filed: Feb. 1, 2002

(65) Prior Publication Data
US 2002/0189747 A1    Dec. 19, 2002

(30) Foreign Application Priority Data
Feb. 2, 2001   (EP)   ................. 01102155

(51) Int. Cl.
*F16B 11/00* (2006.01)
*F16B 12/04* (2006.01)

(52) U.S. Cl. ............. 403/267; 403/268; 156/304.5; 156/310

(58) Field of Classification Search .......... 403/265, 403/267, 268; 156/304.1, 304.5, 305, 310
See application file for complete search history.

(56) References Cited

U.S. PATENT DOCUMENTS 3,639,137 A * 2/1972 Marinelli ............. 428/321.5
3,656,270 A * 4/1972 Phillips ................... 52/693
3,657,379 A * 4/1972 Hilbelink et al. .......... 525/28
3,938,467 A * 2/1976 Radowicz ............... 156/578
4,242,390 A * 12/1980 Nemeth ................. 52/591.4
4,279,340 A * 7/1981 Lang .................... 405/259.6
5,482,583 A * 1/1996 Ihle et al. ................ 156/91
6,004,417 A * 12/1999 Roesch et al. ........... 156/155

FOREIGN PATENT DOCUMENTS

| DE | 4324743 A | 1/1995 | |
| DE | 29703962 U | 4/1997 | |
| DE | 29703962 | * 6/1997 | ........ 52/592.4 |
| FR | 2675078 A | 10/1992 | |
| GB | 2133374 A | 7/1984 | |

* cited by examiner

*Primary Examiner*—Michael Safavi
(74) *Attorney, Agent, or Firm*—Proskauer Rose LLP

(57) ABSTRACT

A joint between two components (2, 4), with both components (2, 4) having joint faces (6, 8) which at least partially correspond with one another, which at least partially press against one another in the jointed state. The technical problem, on one hand, of preserving the advantages of an adhesive joint in comparison to mechanical joining systems, but simultaneously not increasing the outlay by the consumer and the outlay for handling the components, is solved in that a matrix (14, 16) is positioned on at least part of at least one of the joint faces (6, 8), multiple capsules (18) are positioned distributed in the matrix (14), a material of a reaction adhesive system is contained in the capsules (18), and at least a part of the capsules (18) at least partially release the material contained in them under external action. Also, a component having at least one joint face and a method for producing an adhesive matrix on a joint face.

21 Claims, 6 Drawing Sheets a)

b)

c)

d)

JOINT BETWEEN JOINT FACES OF TWO COMPONENTS

Figure 1:
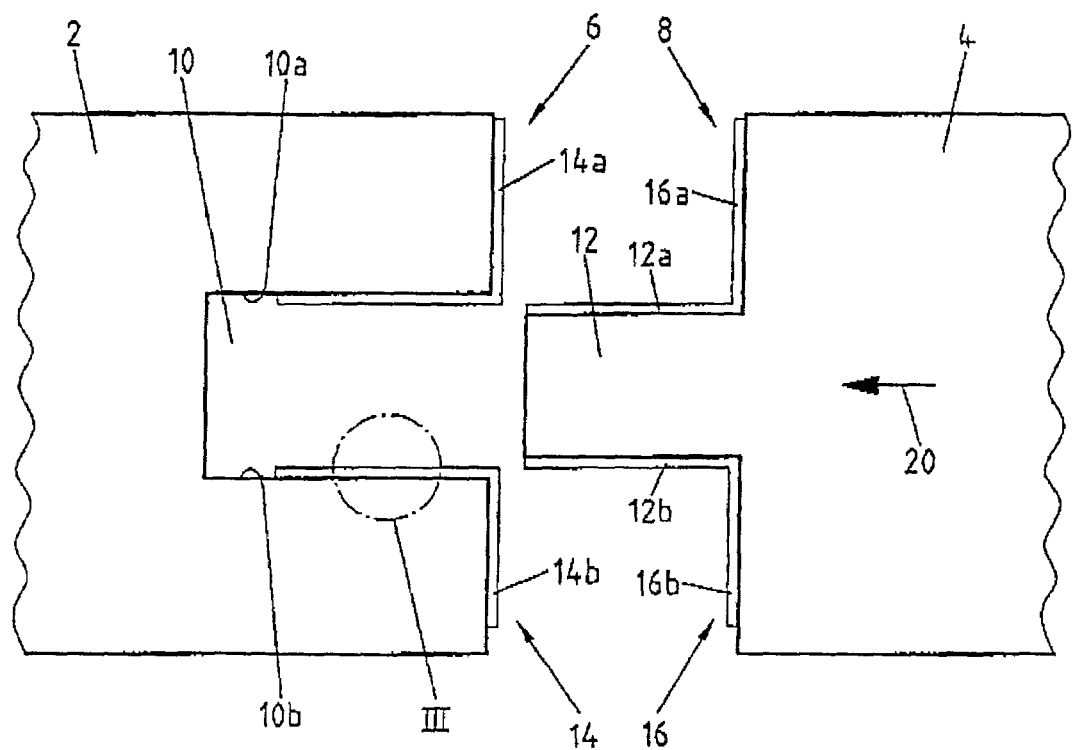

The present invention relates to a joint between joint faces of two components and method for producing an adhesive matrix on a joint face. The present invention particularly relates to a joint between joint faces on which a matrix is applied with an adhesive system which first exhibits its effect of joining the joint faces when the components are joined. The application of the adhesive may also occur at a separate time from the joining of the components, e.g. during the industrial production of the component.

Components are generally understood to be workpieces which are, in the course of their further processing, to be combined with other workpieces into a whole. The workpieces to be joined with one another may be of uniform dimension and nature and may be made of the same materials, but may also be basically different in all possible areas. The present invention particularly, but not exclusively, relates to components of which at least one component is made of a cellulose-containing material.

Various techniques, such as nailing, pegging, screwing, form-fit jointing, e.g. dovetailing, locking, e.g. glueless laying systems for floor coverings, and gluing are known technologies for joining components.

Gluing offers many advantages over fasteners which act purely mechanically. On one hand, the planar jointing of the components allows good transmission of forces from one component to another. Also, if desired and/or necessary, due to the complete filling of the juncture by the adhesive, a closed joint may be implemented which, for example, prevents the penetration of foreign materials such as dust, water, and the like during the assembly phase and in the course of use. Furthermore, in contrast to nailing and screwing, a joint may be produced by gluing which does not show any jointing means externally and therefore is not optically recognizable. This is of great importance above all for floor coverings and for furniture.

The application of adhesive in the course of joining of the components during assembly is, as a rule, very time-consuming and requires professional knowledge about material properties and suitable adhesive systems and/or skill of the person performing the task in order to achieve the desired result. Problems in this case may be, for example, the open time of the adhesive, i.e. the maximum time which may pass between application of the adhesive and joining of the parts to obtain an adequate adhesive joint. The nature of the adhesive itself, since the adhesive may drip if its viscosity is too low, and the increased assembly outlay caused by the application of the adhesive represent further problems.

For laminate floors, for example, it is recommended that significantly more adhesive be applied than is necessary. The adhesive is to issue out along the entire length of the joint after joining of the tongue and groove joint, in order to achieve complete sealing of the adhesive joint. The excess adhesive must then be removed, which is costly, in order to achieve a visually perfect result.

A floor or wall covering is known from the related art of DE 297 03 962 U1, in which the joint faces are implemented as tongue and groove profiles coated with a contact adhesive. This adhesive may already be applied at the factory, so that upon joining of the components along the joint faces, an adhesive joint arises. A contact adhesive is an adhesive which is applied as a solution on the joint faces to be glued and which is joined together under the greatest possible pressure after the solvent has largely evaporated, i.e. when the adhesive films are apparently dry. The assembled adhesive films then essentially form an adhesive layer having high strength, with the residual solvent evaporating. The adhesive effect is based in this case on the physically acting adhesion forces. The permanently present latent adhesive effect due to the adhesive forces is problematic in the contact adhesives used in the related art. Since unilaterally acting contact adhesives lead to an adhesive effect upon pressing against any desired object, the components pre-treated in this way must be protected from pressing against any other objects before they are joined with other components. This is also particularly true for laying the components on packaging material.

The present invention is therefore based on the technical problem of, on one hand, not dispensing with the advantages of an adhesive joint in comparison to mechanical joining systems, but simultaneously not increasing the outlay by customers and the outlay for handling the components.

The technical problems previously described are solved according to a first teaching of the present invention by a joint between two components comprising a matrix, located on at least one joint face, having an encapsulated reactive adhesive system.

The present invention may particularly be used with any desired components. Two separate applications are given for exemplary purposes, without, however, restricting the invention to them.

The components may be panels of floor coverings, such as parquet and laminate floor coverings, and of wall or ceiling coverings, which are mechanically connected with one another to provide a flat covering.

Furthermore, the components may be furniture parts from which a piece of furniture is to be assembled. This case may particularly involve jointing of components made of different materials. For example, components made of wood and/or a wooden material may be jointed with metallic or plastic mountings or with screws. If the mountings or screws are jointed with the components made of wood or a wooden material, a mutual fixing of the components with one another occurs, which allows a long-lasting, strong joint of the furniture parts with one another.

In general, the components may be of identical or different materials. In this case, the type of the respective material is not important, and plastics, metals, and natural materials may be used.

Preferably, at least one component is at least partially made of a cellulose-containing material in this case, for example of a material made at least partially of annual plants such as grass or straw, which is preferably compressed and/or provided with a binder. The material may preferably also be made at least partially of a lignocellulose-containing material, such as wood or a wooden material.

According to the present invention, a reaction adhesive system is used for the permanent jointing of the components. Reaction adhesives are adhesives which harden and set via chemical reactions, for example polyreactions or cross-linking of two or more adhesive components which may be triggered by heat, added hardener, or other components and/or by radiation. The adhesive joints resulting from this are very strong and durable.

The materials participating in the reaction are, on one hand, the adhesive components themselves, which are part of the hardened adhesive layer after completion of the chemical reaction. These adhesive components also include the hardener. On the other hand, the materials are reaction accelerator and/or co-initiators. Co-initiator is understood to mean a component which only causes the hardener and/or accelerator to display its effect upon the presence of specific conditions, e.g. temperature, pH value, radiation energy, or moisture.

For example, reaction adhesive systems based on isocyanate, on epoxy, or on unsaturated systems, are suitable, as are sulfidic systems, adhesives based on siloxane, and acid hardening systems. In principle, however, all systems may be used which require at least two components for the chemical hardening reaction. Hardening reactions may be achieved by free-radical generators such as peroxide, azo compounds, redox systems, radiation (UV and visible light), or by acidifiers. Single component adhesive systems are also possible. The hardening then occurs in combination with moisture, as in, for example, single component isocyanate systems.

The reaction adhesive system is further implemented as encapsulated according to the present invention, with at least one of the materials participating in the chemical reaction being applied in encapsulated form, i.e. in capsules. In this way, an adhesive component, a hardener, an accelerator, and/or a co-initiator may be contained in the capsules.

Encapsulation is understood to mean the enveloping of a material droplet. Multiple capsules obtained in this way are dispersed in a matrix. The envelopment of the capsules must, for one thing, be implemented in such a way that, on one hand, the material contained therein survives the application process and the storage until joining of the parts without undesired change and, in addition, it is compatible with the matrix. On the other hand, an activation of the hardening reaction in the course of joining must be possible. This is achieved in that the capsule envelopes are broken open, with the now exposed material of the adhesive system being partially or completely located on the joint surface and entering into a chemical reaction with at least one material and/or adhesive component of the reactive adhesive system and/or accelerating or initiating the chemical reaction. Only in this way is the gluing of the two components caused as a consequence of assembly.

The capsules may be broken open, for example, by the effect of mechanical forces, for example by pressure or friction. For the activation of the reaction adhesive, however, in addition to the effect of a pressure or friction force, all other techniques which cause breaking open of the capsules are suitable. The breaking open of the capsules may be performed by the use of auxiliary means, such as by the application of a liquid which dissolves the capsule, such as water, by spraying, painting, rolling, or similar means, by the effect of ultrasound energy, high frequency energy, thermal energy, e.g. infrared radiation, or the effect of UV radiation.

The reactive adhesive system itself may comprise one single component, which reacts with water as the second component, or also two or more components and/or materials. Parts of the matrix or the entire matrix itself may also be components and/or materials of the adhesive system.

The application of a reactive adhesive system made of multiple components may be performed in such a way that on one joint surface, one component is applied as an encapsulated system, and the other component is placed in an analogous way on the other joint surface. In the course of joining, the capsules are caused to break open in one of the ways previously described, which causes the two components to come into contact with one another and mix. Rapid hardening of the adhesive is the result.

The matrix in which the capsules are dispersed primarily has the task of anchoring the capsules on the surface of the joint faces so lastingly that they remain there until the instant of assembly of the components. For this purpose, the matrix comprises either an adhesive, particularly a melt adhesive, or a wax or resin.

In addition, the matrix may also assume further tasks, such as sealing of the joint surface, particularly as protection against the penetration of moisture, hardening of the joint face, or the function of a jointing agent, if the encapsulated adhesive components have adhesion problems with the joint surface.

The matrix may, however, also itself be at least partially made of a material of the adhesive system. In this case, the capsules contain the material(s) which lead to the material of the adhesive system contained in the matrix being brought into chemical reaction jointly with this material, with subsequent hardening.

The encapsulated adhesive system may be applied either to only one joint face or to both joint faces. Application on only one side is less cumbersome if only one of the two components is accessible for prior processing.

Significant product advantages result above all in regard to the use of the previously described encapsulated adhesive systems for laminate floors. Until now, in principle there were two types of connection possibilities. In one, the joining of the individual panels is performed by means of an adhesive, as a rule a PVAc adhesive, referred to as a cold glue. In the other, a mechanical coupling and/or locking of the panels occurs, in which, however, additional gluing is also possible. The use of the cold glue, however, requires a high outlay of time for the assembly. The glue is applied by hand and has to issue out on the surface during joining of the parts. Only after drying is complete is the excess glue cleaned off.

The advantages of gluing the panels over mechanical locking systems is that a closed surface is obtained which prevents the penetration of water very well. The advantage of mechanical locking is rapid installation. A preferred embodiment of the present invention thus allows the advantages to be combined, without increasing the outlay for handling before assembly of the components. On one hand, as with cold glue, a closed, seam-free surface is obtained, and, on the other hand, rapid installation is possible as in mechanically locked installation systems.

According to a second teaching of the present invention, the problem described above is also solved by a component with at least one joint face in which the previously described features are implemented in the form of a matrix, located on at least one joint face, having an encapsulated reactive adhesive system.

According to a third teaching of the present invention, the problem described above is also solved by a method for producing a matrix having multiple capsules containing at least one material of the reactive adhesive system on a joint face of a component.

In this method, at least one matrix layer is applied, with the aid of an application system, which at least partially has matrix material and at least partially has capsules and in which the matrix layer obtained in this way is at least partially fixed. According to the present invention, a matrix film suitable for the implementation of a reactive encapsulated adhesive system is thus applied onto the joint face(s).

Fixing is to be understood in this case to mean that the matrix film has a consistency and that this consistency is dimensionally stable and largely inherent in regard to adhesion to packaging and other surfaces. This is particularly performed if the following processing steps require it, e.g. packaging, intermediate storage, etc. The application technique must in addition be tailored to, for example, the planar or spherical shape of the joint face which is to be equipped with capsules.

There are various preferred embodiments of the method according to the present invention, which are described in the following.

In a first preferred embodiment of the method according to the present invention, first the capsules are dispersed in the matrix material before application. With the aid of the application system, at least one matrix layer made of matrix material is then applied to at least one part of the joint face, which then receives an essentially uniform distribution of the capsules. Subsequently, the matrix layer obtained in this way is at least partially fixed.

In a second preferred embodiment of the method according to the present invention, at least one matrix layer made of matrix material is applied to at least one part of the joint face with the aid of the application system. Particular care does not have to be taken in this case for extremely low application of force due to failure of the capsules. The not yet completely fixed, particularly still damp matrix layer has slightly adhesive properties. The capsules, which are preferably provided as a fine powder, are applied to this layer in a second step. Subsequently, the matrix layer obtained in this way is at least partially fixed.

In both of the previously described methods according to the present invention, the matrix material at least partially comprises a dissolved adhesive which is at least partially fixed after the application by drying. The drying may be performed in this case with known drying technologies, e.g. hot air, infrared drying, high frequency, or microwaves.

In a third preferred embodiment of the method according to the present invention, at least one matrix layer made of capsules at least partially enveloped by matrix material, which is subsequently at least partially fixed, is applied with the aid of the application system. In this case, the matrix material particularly at least partially comprises a melt adhesive, which is at least partially melted after the application by heating and is subsequently fixed again by cooling. In this way, from the enveloping of the capsules, on one hand, an essentially uniform matrix layer is produced and, on the other hand, the matrix layer adheres well on the joint face due to the melting of the melt adhesive.

In the method according to the present invention for producing a matrix having multiple capsules on a joint face, the application of the adhesive system may be performed, depending on the viscosity and stability of the capsules relative to the effect of external forces, with typical application systems such as spraying, painting, rolling, puttying, scattering, and the like.

Suctioning off capsules applied in too great a quantity, which have not found sufficient anchoring in the matrix, may be advantageous. The capsules suctioned off may be fed back to the reservoir of capsules. Multiple applications of capsules which contain identical materials and/or other materials of the adhesive system is also possible.

After the application of the capsules, the application of a further matrix layer may be performed as previously described. In this way, a better anchoring of the capsules on the surface is achieved. This layer may, for example, be identical with the matrix components of the first layer or may also be composed of other materials. A subsequent fixing, as it was previously described, may also be performed. A multilayer construction of matrix and capsules is also possible.

Figure 4:
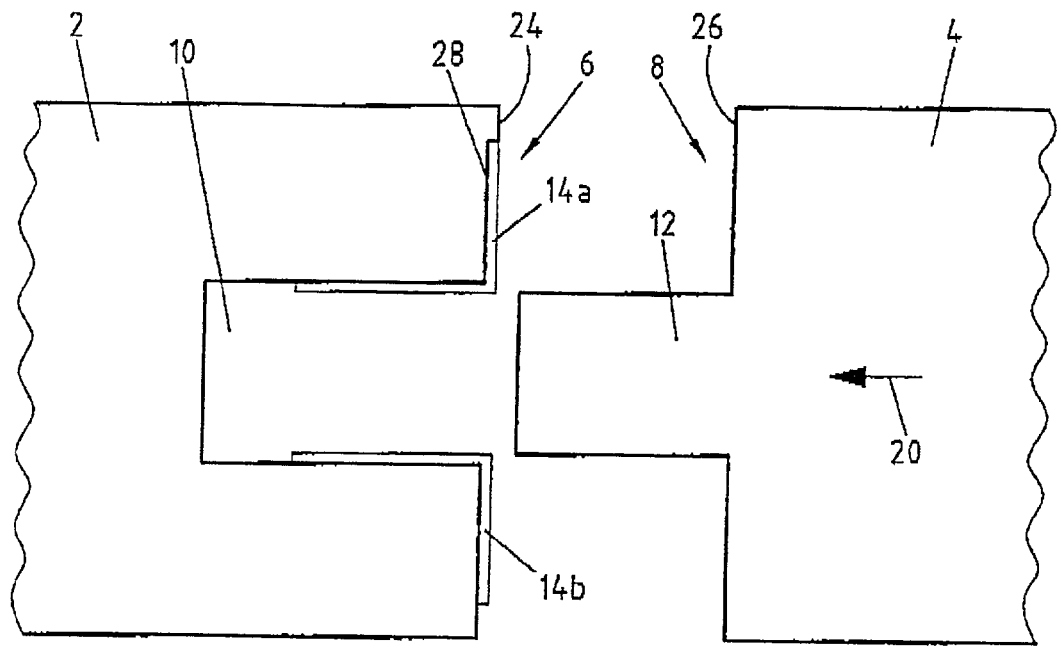
Figure 5:
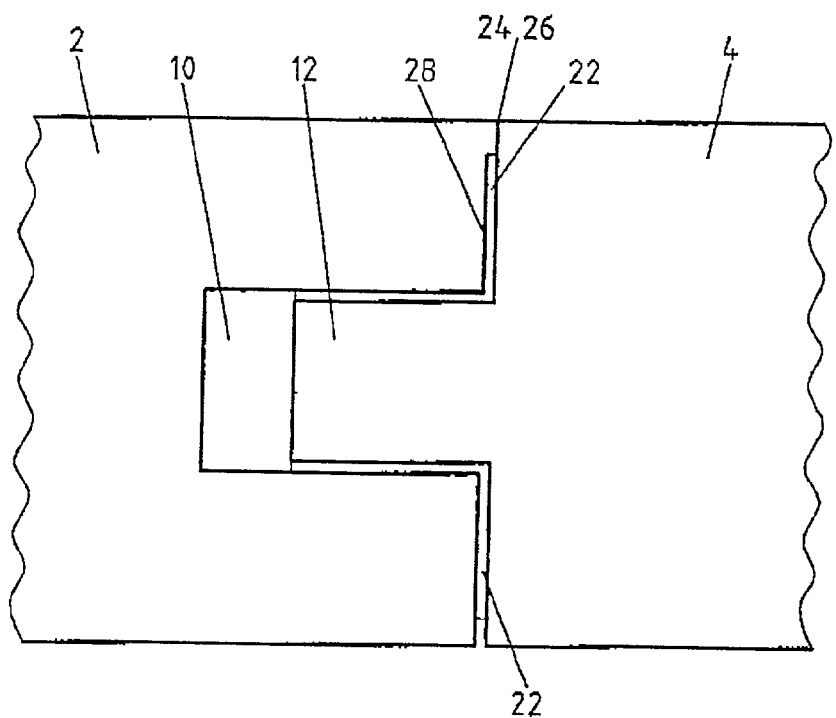
Figure 6:
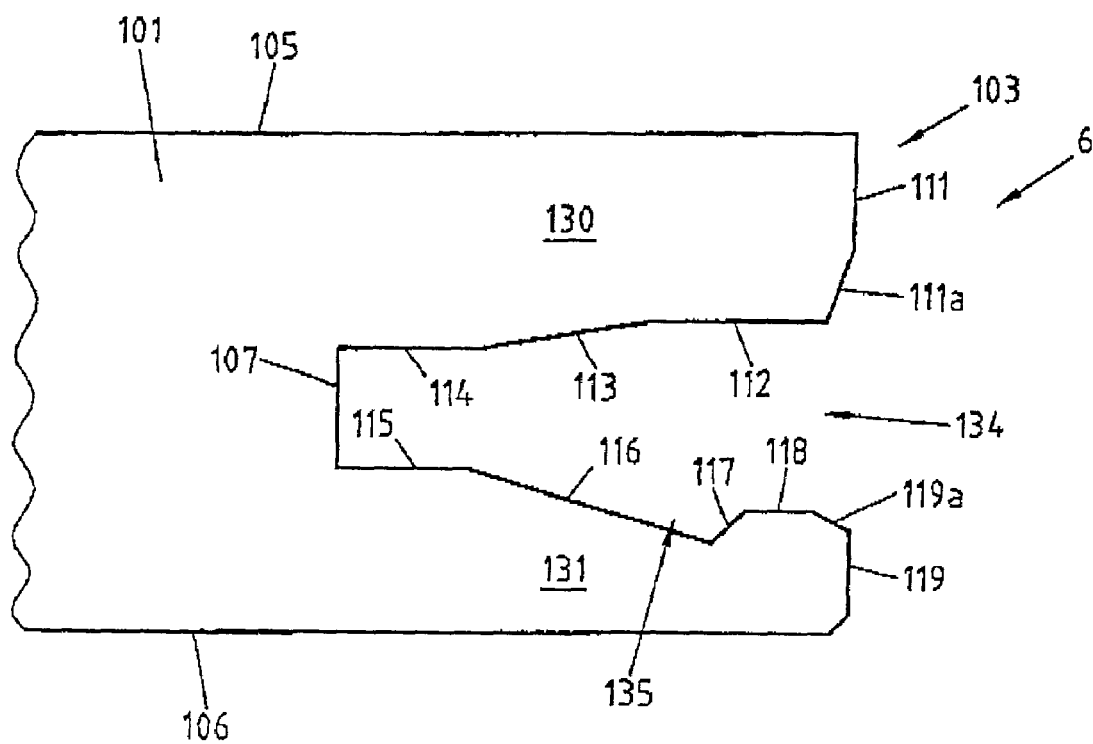
Figure 7:
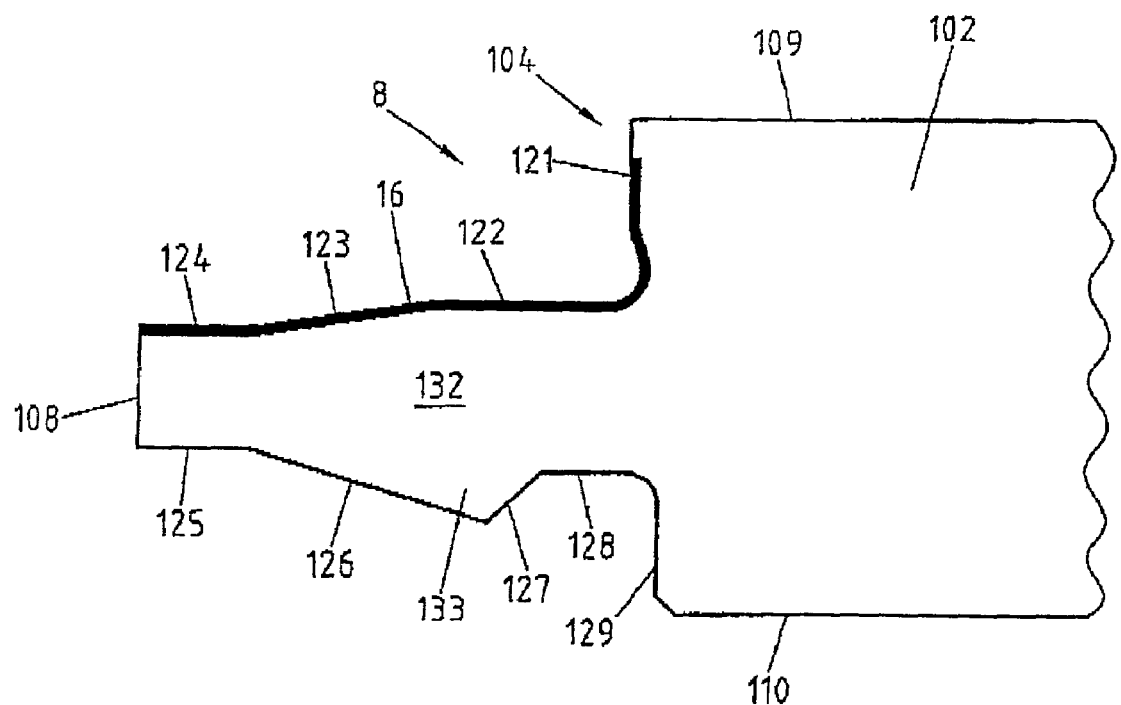
Figure 8:
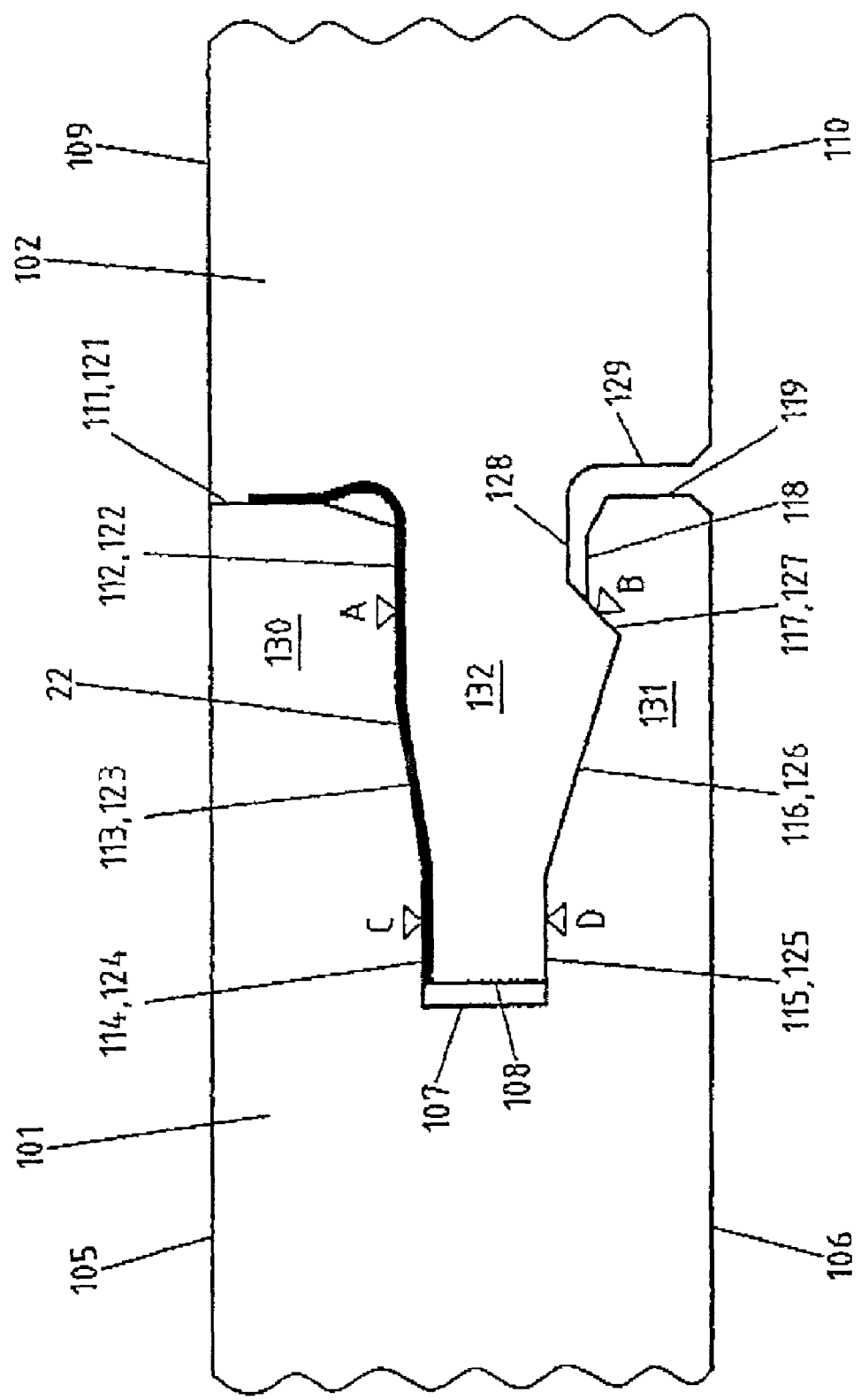
Figure 9:
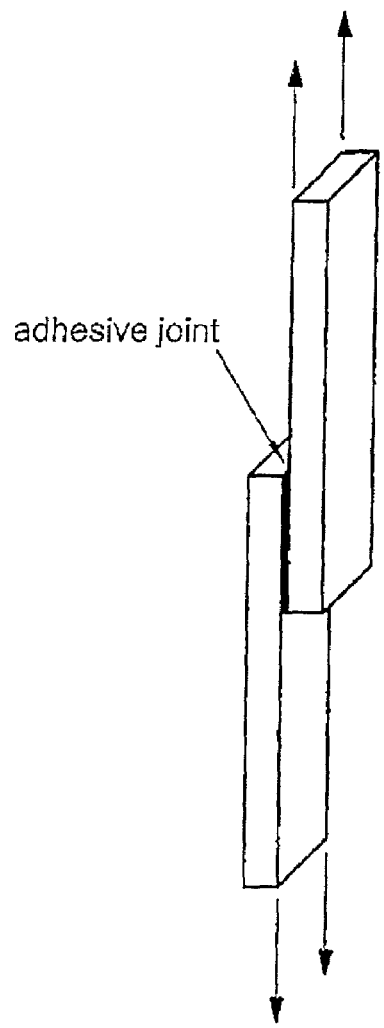
Figure 10:
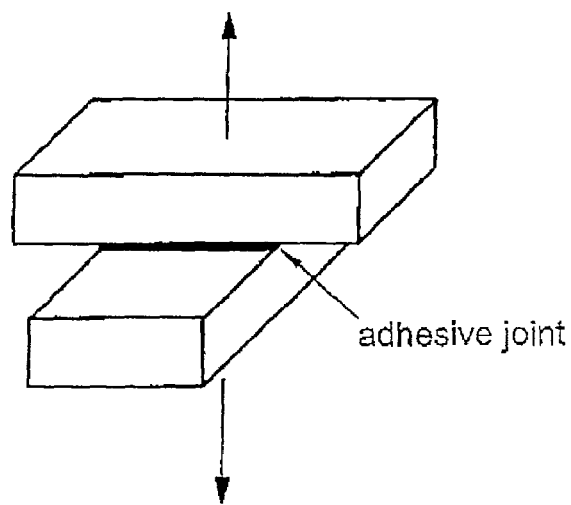
Figure 11:
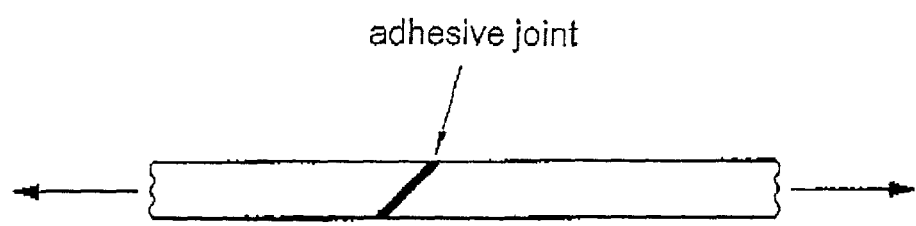

The present invention is described in the following with reference to exemplary embodiments, with reference being made to the attached drawing. In the drawing, FIG. 1 shows a first exemplary embodiment of components having joint faces for a joint according to the present invention, with the components being positioned at a distance from one another, FIG. 2 shows the exemplary embodiment illustrated in FIG. 1 after assembly of the components, FIGS. 3a–d show various details in III in FIG. 1, which represent various embodiments of the joint matrix, FIGS. 4, 5 show a second exemplary embodiment of components having joint faces for a joint according to the present invention, FIGS. 6–8 show a third exemplary embodiment of components having joint faces for a joint according to the present invention, FIGS. 9–11 show illustrations to clarify the tests performed to determine the strength of the joint according to the present invention.

Figure 2:
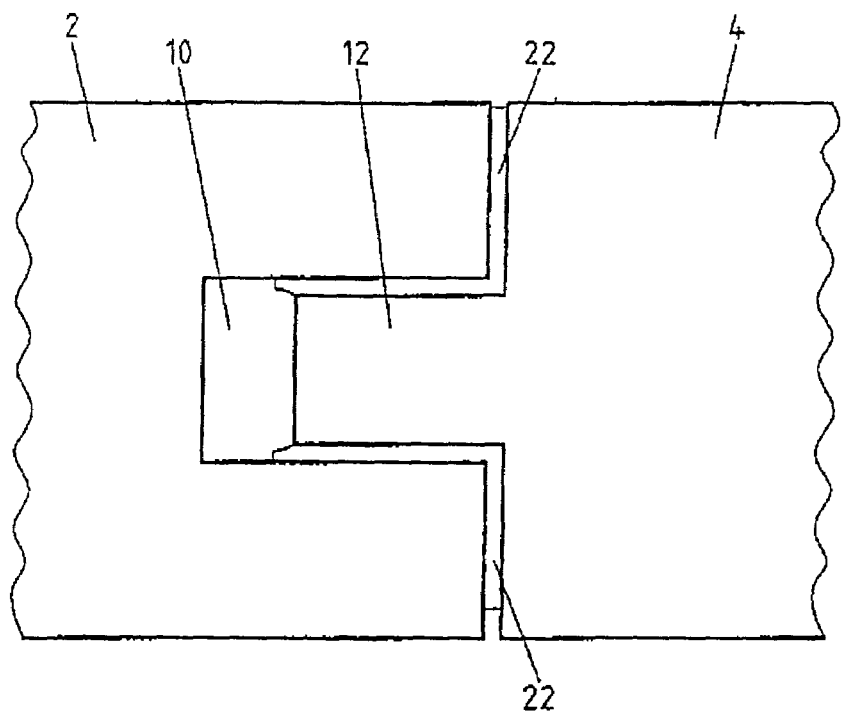

FIGS. 1 and 2 show a joint according to the present invention between two components 2 and 4. Both components 2 and 4 have joint faces 6 and 8 which correspond with one another at least in sections, which press against one another in the jointed state. In the present case, joint face 6 is implemented with a groove 10 and joint face 8 is implemented with a tongue 12 as a tongue and groove profile, however, no restriction of the present invention is to be understood from this. As will be described in more detail in the following, the joint according to the present invention may also be used on joint faces of any desired shape, i.e. also flush joint faces.

As FIG. 1 shows, a matrix 14 or 16, respectively is located on sections of both joint faces 6 and 8. A first section 14a of matrix 14 runs in component 2 from the upper edge of joint face 6 to upper side 10a of groove 10, while other section 14b of matrix 14 extends from lower side 10b of groove 10 to the lower edge of joint face 6. Furthermore, a first section 16a of matrix 16 runs from the upper edge of joint face 8 to upper side 12a of tongue 12, while a second section 16b of matrix 16 extends from lower side 12b of tongue 12 to the upper edge of joint face 8.

The detail indicated with III in FIG. 1 is illustrated enlarged in FIGS. 3a to 3d for various embodiments of the matrix.

FIGS. 3a to 3d, which are described in more detail in the following, show multiple capsules 18 which are positioned distributed in matrix 14. According to the present invention, a material of a reaction adhesive system is contained in capsules 18. Since the capsules 18 in the situation shown in FIG. 1 are largely closed, the material remains isolated within matrix 14, so that the chemical reaction with the at least one further material of the reaction adhesive system is avoided. A stable state, even over a long period of time, is thus maintained, so that the application of the matrix may also occur at the factory, with the assembly of components 2 and 4 only occurring at a later time.

During the assembly, which is indicated with arrow 20 in FIG. 1, individual capsules 18 at least partially release the material contained in them under external influence. A chemical reaction of this material of the adhesive system with another material of the adhesive system present in matrices 14 and 16 thus occurs, so that hardening occurs. In this state, as FIG. 2 shows, a joint adhesive layer 22 is implemented between two components 2 and 4, which mainly comprises the reacted reaction adhesive.

During the assembly of components 2 and 4, capsules 18 are opened under the effect of force by pressure and friction, in order to at least partially release the adhesive. In addition, capsules 18 may also at least partially release the material under the effect of external energy, particularly high frequency energy, ultrasound energy, thermal energy, light energy, or UV energy. Furthermore, capsules 18 may at least partially release the material under the effect of a liquid, particularly water.

Matrices 14 and 16 are made of an adhesive, resin, or wax in order to ensure sufficient fixing and stabilization of capsules 18, which are positioned distributed. In addition, matrices 14 and 16 effect a seal of joint faces 6 and 8, particularly against the penetration of moisture before and after the joining of components 2 and 4.

Various embodiments of matrix 14 on a part of joint face 6 are illustrated in FIGS. 3a to 3d.

Figure 3:
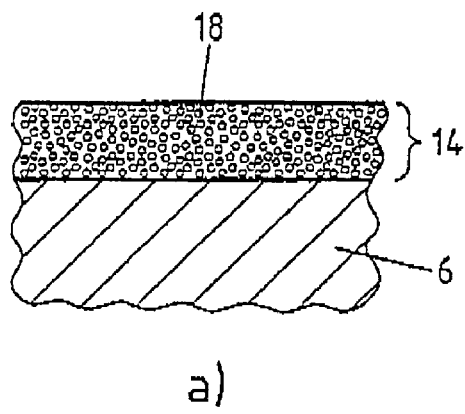
Figure 3:
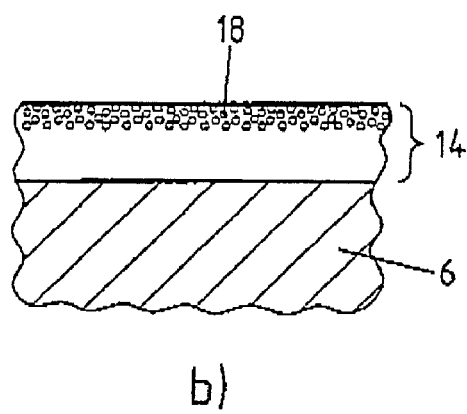
Figure 3:
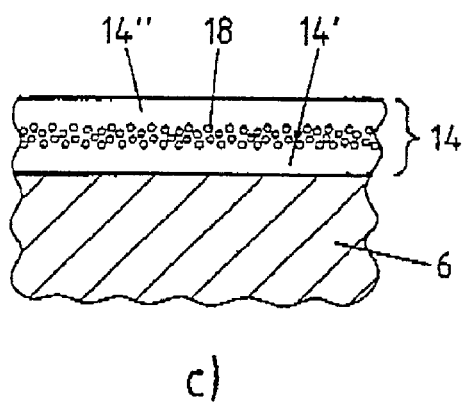
Figure 3:
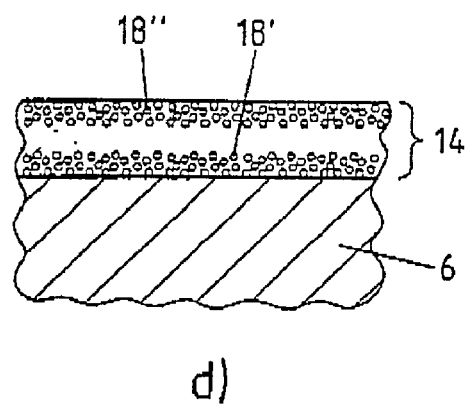

FIG. 3a shows a matrix in which capsules 18 are positioned distributed essentially homogenously. This structure is achieved above all during production in that before the production of matrix 14, the capsules are already positioned distributed in the material to be applied and matrix 14 may therefore be applied in one work cycle to joint face 6.

FIG. 3b shows an embodiment of matrix 14 in which capsules 18 are positioned essentially in the upper section of matrix 14. This arrangement is achieved during production particularly in that first the material of matrix 14 is applied to joint face 6 and capsules 18 are subsequently applied to matrix 14, which is not yet fixed. During the subsequent drying of matrix 14, the capsules are fixed in their distribution in the uppermost layer of matrix 14, so that the distribution shown in FIG. 3b results.

FIG. 3c shows a structure of matrix 14 in which capsules 18 are positioned essentially centrally within the overall matrix layer. On both sides above and below, matrix layers 14' and 14" are provided without capsules 18 contained therein. This structure is obtained, for example, in that capsules 18, as described in connection with FIG. 3b, are applied on first matrix layer 14', which is subsequently also covered with further matrix layer 14". Two matrix layers 14' and 14" may contain identical or different materials of the reacted adhesive system.

Finally, FIG. 3d shows a structure of matrix 14 in which a layer of capsules 18 is positioned in each of the upper and lower sections of matrix 14. This may be produced by a combination of the previous method steps.

As already described, the reaction adhesive comprises at least two components, with capsules 18 containing a first component of the reaction adhesive. For a simple reaction adhesive system, the second component comprises water.

Therefore, it is sufficient in this case for the joint according to the present invention that before the assembly of the components, one or both joint faces 6 and/or 8 is moistened or wetted with water. Thus, when capsules 18 release the first component during the assembly, the chemical reaction necessary for hardening of the reaction adhesive occurs. The structure of matrix 14 illustrated in FIG. 3b is preferably selected for this purpose, so that the adhesive components released from capsules 18 come in contact with the water as directly as possible.

In another embodiment, matrix 14 and/or 16 at least partially has a second component of the reaction adhesive, so that the chemical reaction may also occur directly within matrix 14 and/or 16. Furthermore, capsules 18 and/or matrix 14 may have at least one further component or one further material of a reaction adhesive, which is necessary for the chemical reaction. For this type of reaction adhesive system, the structure of matrix 14 illustrated in FIG. 3a is suitable above all, since even before the occurrence of the external effect, a homogenous distribution of capsules 18 exists. A matrix 14 with a structure as shown in FIG. 3c may also be used.

Furthermore, at least two different types of capsules 18', 18" having different components and/or materials of the reaction adhesive system may be provided. In this case, different capsules 18', 18" release their respective components and/or materials under the external effect, so that the chemical reaction occurs within matrix 14 and/or 16. The structure of matrix 14 shown in FIG. 3d is particularly suitable for this type of the adhesive system. Capsules 18' and 18" may also be positioned uniformly distributed in matrix 14, as is shown in FIG. 3a by way of comparison.

As illustrated in FIGS. 1 and 2, both joint faces 6 and 8 are provided with matrix 14 and/or 16 containing capsules 18.

As FIGS. 4 and 5 show, it is also possible within the framework of the present invention that only joint face 6 is provided with the matrix 14. In this case, joint face 8 is first covered with matrix 14 during the assembly, and a solid joint is implemented by the contact with matrix 14.

In a further embodiment according to FIGS. 1 and 2, joint face 6 is provided with a matrix 14 having first capsules 18' and other joint face 8 is provided with a matrix 16 having second capsules 18", with first capsules 18' containing a first component and second capsules 18" containing a second component of a reaction adhesive comprising at least two components. The structure illustrated in FIG. 3b is used as a preferred structure of matrices 14 and 16 in this case, in order that the different capsules 18' and 18" may come directly into contact with one another during assembly and the chemical reaction may occur as rapidly as possible.

FIGS. 4 and 5 show still a further aspect of the present invention. Since matrix 14 is applied to the surface of joint face 6, the surface is correspondingly bulked up by its thickness, for example in the range of a few tens of millimeters. In order to ensure a good fit between two components 2 and 4, particularly in the region of joint edges 24 and 26, a depression 28 is provided in the region of the upper outer vertical section of joint face 6 for application of matrix 14. Applied matrix 14 then projects only slightly in front of joint edge 14 to the right in FIG. 4, so that after the assembly of two components 2 and 4, joint edges 24 and 26 fit against one another and form an essentially sealed joint. Therefore, matrix 14 is also not drawn up to the uppermost end of joint edge 24. Simultaneously, matrix 14 is subjected to a mechanical pressure by the application to joint face 8, which triggers the chemical reaction in the way described.

FIGS. 6 to 8 show a known profile of a tongue and groove joint for two panels 101 and 102 of a floor covering, which may be coupled with one another by means of a mechanical lock. The profile may be described in more detail as follows.

FIG. 6 shows a first panel 101, in whose outer edge 103 a groove 134 is incorporated. For this purpose, edge 103 has multiple surfaces 111 to 119 slanted at different angles to surface 105, whose course may be seen in FIG. 6.

FIG. 7 shows a second panel 2 [sic], which has a tongue 132 at an edge 104, which is preferably implemented as integral with panel 102. Edge 104 has multiple surfaces 121 to 129 at different angles to surface 109, whose course may be seen in FIG. 7 and which are aligned essentially parallel to corresponding surfaces 111 to 119.

FIG. 8 shows both panels 101 and 102 in the state in which they are mechanically connected with one another.

For this purpose, tongue 132 of panel 102 is engaged with upper lip 130 and lower lip 131 of groove 134 of panel 101.

In the locked state, the surfaces of groove 134, on one hand, and of tongue 132, on the other hand, press flatly at least partially against one another in pairs. From this, at least the pairs of fitted surfaces 112, 122; 114, 124; 115, 125; and 117, 127 result, which are indicated with the open triangles and the capital letters A, B, C, and D. This effects both good bending stiffness and good reliability against panels 101 and 102 being pushed apart.

Both panel 101 and panel 102 may be provided around their periphery either with the profile shown in FIG. 6 or with the profile shown in FIG. 7, so that multiple panels 101 and 102 may be connected with one another into a planar arrangement. For this purpose, panels 101 and 102 each have a profile as shown in FIG. 6 on one lengthwise side and one transverse side and a profile as shown in FIG. 7 on the other sides.

Although the edge profile previously described already has a good locking quality, its permanent effect may be amplified if the two profiles are understood simultaneously as joint faces 6 and 8 according to the present invention. For this purpose, FIGS. 7 and 8 shows that joint face 8 of panel 102 is provided with a matrix 16 which covers a predetermined section of joint face 8. In order to ensure exact fit of the surfaces of the locking profile, the section of joint face 16 [sic] covered with matrix 16 is provided with a peripheral depression in the way already described above, so that after the application of matrix 16, it projects only slightly above the actual locking profile. During the assembly of two profiles and/or joint faces 6 and 8, the effect described is produced by the mechanical influence of pressure and friction, in that capsules 18 contained in matrix 16 burst and release the material contained therein.

FIG. 8 then shows both panels 101 and 102 in the locked state, with reacted adhesive layer 22 effecting a stability of the joint in addition to the mechanical lock.

As has already been seen in FIGS. 6 to 8, in the present case, horizontally running surfaces 122 and 124, and/or also 123 of the locking profile are preferably provided with matrix 16. Since precisely these surfaces rub against the corresponding surfaces during the assembly of panels 101 and 102, it is reliably ensured that capsules 18 burst and/or are otherwise mechanically damaged.

The following examples are to describe various fields of application of the joint according to the present invention. The binder application was between 250 and 300 g/m² wet weight.

EXAMPLE 1

An encapsulated adhesive system was applied at approximately 300 g/m2 wet weight onto 6 mm thick strips made of beechwood (*fagus silvatica*). The adhesive system corresponded to the properties of a peroxide-hardened methacrylate system.

After the application, the individual strips were dried with a hot air dryer until they were dry to the touch. After intermediate storage of several days, two strips at a time were assembled with an overlap of 3 cm by simply placing the two strips on top of one another, see FIG. 9, and stored without external pressure influence.

After approximately 30 minutes, 2 cm wide strips were cut off in each case and the tensile force (shear force) parallel to the adhesive joint was determined with a universal testing machine. Comparative samples were produced with a commercially available cold glue of class D3. The testing was performed after 4 hours of hardening time.

The results were as follows (average of 10 samples each)
Encapsulated adhesive system: 2.75 kN breaking load
Comparative samples of cold glue: 3.02 kN breaking load
The breaking load of the encapsulated adhesive system is comparable with that of cold glue, although in this case no optimization for a wooden surface is present yet.

EXAMPLE 2

Example 2 comprises gluing of panels of a laminate floor corresponding to FIGS. 1, 2, 4, and 5. Typical panels made of a carrier plate, which comprises a high density fiber plate (HDF), with a conventional tongue and groove profile were painted with an encapsulated system as in example 1.

In series 1, the adhesive was applied over the entire profile face of the groove and the tongues, and in series 2, the adhesive was applied on the sides parallel to the floor surface, i.e. the upper and lower inner sides of the groove and/or on the upper and lower sides of the tongue. No adhesive was applied to the faces of the profile perpendicular to the upper sides. The panels treated in this way were dried with a hot air dryer and then stored for several days.

As a control sample, panels were, as recommended by the producer, painted on the upper sides of the tongue with cold glue of type D3 and the two corresponding panel sides were subsequently assembled. The glue issuing out at the top was carefully removed after 4 hours with a caulking tool. The testing of these panels was performed after 5 hours of drying time.

The panels of series 1 and 2 were pushed together approximately 15 minutes before the test and, in the pushed-together state, lightly moved back and forth a few millimeters several times in the direction of the joint.

Before the test, strips of 5 cm in width were cut off perpendicular to the adhesive joint. The tensile test was performed on a universal testing machine. The maximum tensile force determined was as follows (average value from 10 samples each)

| | |
|---|---|
| Series 1: | 1.04 kN/5 cm |
| Series 2: | 1.24 kN/5 cm |
| Control sample: | 0.36 kN/5 cm |

A tensile strength of approximately 1 kN is a standard value for the tensile strength. The samples of series 1 and 2 achieved this value, the control sample was well under this. The setting time of 5 hours is in no way sufficient—one may clearly recognize here the advantage of the encapsulated system for the installation of floor panels.

EXAMPLE 3

Particle board strips and oaken strips (*quercus rubra*), each 5 cm wide and 10 cm long, were coated in the center on an area of 5×5 cm² with a binder from example 1. After drying with a hot air dryer, the samples were stored for several days.

Fifteen minutes before the test, one particle board strip and one oaken strip were joined together under light pressure and with multiple motions of the joined parts back and forth for a few millimeters, see FIG. 10. No external pressure was applied to the adhesive joint, e.g. by means of clamping or something similar.

The test was performed perpendicular to the adhesive joint. The average value from 7 tests was 1.05 N/mm² — sometimes chips were torn off from the cover layer of the particle board.

EXAMPLE 4

Jointing of wood with metals and/or plastics is also possible. Analogously to example 1, strips made of beechwood (fagus silvatica) were glued together with 8 mm thick metal strips and with an HPL (high-pressure laminate) with a thickness of 1 mm. For this purpose, beechwood strips were prepared as in example 1. The metal strips were made, on one hand, of typical aluminum, and, on the other hand, of iron.

After storage for several days, the beechwood strips were assembled with the metal strips under the effect of light pressure. The metal surface was lightly polished and subsequently cleaned and degreased. After a hardening time of 15 minutes, a tensile test was performed as described in example 1.

The results were as follows: (average value from 5 samples each, test area 2×3 cm²):

| | |
|---|---|
| Iron: | 1.82 kN breaking load |
| Aluminum: | 1.54 kN breaking load |
| Laminate material: | 2.38 kN breaking load |

EXAMPLE 5

Example 5 describes the jointing of PVC floor plates. Two plates of a thickness of 1.8 mm were each beveled on one side at an angle of 20° diametrically opposed to the other plate, this is also referred to as scarf joining. The two beveled faces were painted with the adhesive from example 1, dried in a known way, and stored for several days.

The parts concerned were then pushed over one another lying in the same plane and light pressure was applied to the overlap. After 15 minutes, tensile tests were performed, see FIG. 11.

5 cm wide strips were then cut out of the assembled plates perpendicular to the adhesive joint and these were tested for tensile strength analogously to example 2. The maximum tensile force determined was 0.25 kN/5 cm (average of 5 samples).

The invention claimed is:

1. A joint between two structural components comprising:
   (a) joint faces on both components wherein the joint faces at least partially correspond with one another and at least partially contact one another in the jointed state;
   (b) a matrix positioned on at least a part of at least one of the joint faces;
   (c) multiple capsules dispersed completely within the matrix; and
   (d) a material of a reaction adhesive system contained in the capsules, wherein the matrix comprises at least two matrix layers, wherein at least one of the two matrix layers contains the dispersed capsules and at least one of the two matrix layers contains no capsules, and wherein at least part of the capsules at least partially release the material contained therein completely within the matrix under external influence.

2. The joint according to claim 1, wherein the capsules at least partially release the material under the effect of force, wherein said force is selected from the group consisting of pressure and friction.

3. The joint according to claim 1, wherein the capsules at least partially release the material under the effect of external energy, wherein the external energy is selected from the group consisting of thermal energy, ultrasound energy, high frequency energy, light energy, and UV energy.

4. The joint according to claim 1, wherein the capsules at least partially release the material under the effect of a liquid, wherein said liquid comprises water.

5. The joint according to claim 1, wherein the matrix is made of an adhesive, resin or wax.

6. The joint according to claim 5, wherein the matrix effects a seal of the joint face.

7. The joint according to claim 1, wherein the material reaction adhesive system comprises at least two elements, the capsules contain a first element of the material reaction adhesive system, and water represents the second element.

8. The joint according to claim 1, wherein the material reaction adhesive system comprises at least two elements, the capsules contain at least one element of the material reaction adhesive system, and the matrix at least partially comprises a second element of the material reaction adhesive system.

9. The joint according to claim 8, wherein the capsules or the matrix have at least one further element of the material reaction adhesive system.

10. The joint according to claim 8, wherein the material reaction adhesive system comprises at least two different types of capsules having different elements of the material reaction adhesive system.

11. The joint according to claim 1, wherein the structural components are panels of a floor covering.

12. The joint according to claim 1, wherein the at least two matrix layers comprise different elements of the material reaction adhesive system.

13. The joint according to claim 1, wherein the two matrix layers comprise different elements of the material reaction adhesive system.

14. The joint according to claim 1, wherein both joint faces comprise the matrix containing capsules.

15. The joint according to claim 14, wherein one of the joint faces comprise a matrix having first capsules and the other of the joint faces comprise a matrix having second capsules, with the first capsules containing a first element and the second capsules containing a second element of a material reaction adhesive system.

16. The joint according to claim 1, wherein the joint faces of both structural components abut against one another.

17. The joint according to claim 1, wherein the joint faces of both structural components are implemented as a tongue and groove joint.

18. The joint according to claim 1, wherein at least one structural component is made of a cellulose-containing material.

19. The joint according to claim 18, wherein at least one structural component is made of wood or a wooden material.

20. The joint according to claim 18, wherein one of the two structural components is made of a cellulose-containing material, and the other of the two structural components is made of a metal or a plastic.

21. A structural component comprising:
   (a) at least one joint face for a joint with further components;

(b) a matrix positioned on at least part of said at least one joint face;
(c) multiple capsules dispersed completely within the matrix; and
(d) a material of a reaction adhesive system contained in the capsules, wherein the matrix comprises at least two matrix layers, wherein at least one of the two matrix layers comprises the dispersed capsules and at least one of the two matrix layers comprises no capsules, and wherein at least a part of the capsules at least partially release the material contained in them completely within the matrix under external influence.

* * * * *